US010680965B1

(12) United States Patent
Pingale et al.

(10) Patent No.: US 10,680,965 B1
(45) Date of Patent: Jun. 9, 2020

(54) REDISTRIBUTION OF VPN TUNNELS AMONG VPN CONCENTRATORS

(71) Applicant: Hewlett Packard Enterprise Development LP, Houston, TX (US)

(72) Inventors: Amit Pingale, Santa Clara, CA (US); Shreekanth Chandranna, Santa Clara, CA (US); Sushil Regmi, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/250,447

(22) Filed: Jan. 17, 2019

(51) Int. Cl.
| | |
|---|---|
| G06F 15/173 | (2006.01) |
| H04L 12/863 | (2013.01) |
| H04L 12/46 | (2006.01) |
| H04L 12/707 | (2013.01) |
| H04L 12/761 | (2013.01) |
| H04L 12/24 | (2006.01) |

(52) U.S. Cl.
CPC ...... *H04L 47/6225* (2013.01); *H04L 12/4675* (2013.01); *H04L 41/0813* (2013.01); *H04L 45/16* (2013.01); *H04L 45/22* (2013.01)

(58) Field of Classification Search
CPC ............. H04L 47/6225; H04L 12/4675; H04L 41/0813; H04L 45/16; H04L 45/22
USPC ....................................................... 709/238
See application file for complete search history.

(56) References Cited

U.S. PATENT DOCUMENTS

| | | | | |
|---|---|---|---|---|
| 6,704,282 | B1* | 3/2004 | Sun ..................... | H04L 12/4641 370/237 |
| 7,197,550 | B2* | 3/2007 | Cheline ................. | H04L 29/06 370/252 |
| 7,376,743 | B1* | 5/2008 | Bazzinotti .......... | H04L 12/4641 370/236 |
| 7,957,304 | B2 | 6/2011 | Kalbag | |
| 8,443,435 | B1* | 5/2013 | Schroeder ............... | H04L 63/08 726/15 |
| 2017/0195161 | A1* | 7/2017 | Ruel .................. | H04L 12/4633 |

OTHER PUBLICATIONS

Cisco, Setting General VPN Parameters, pp. 1-18, Retrieved from Internet on Oct. 18, 2018 from URL:<cisco.com/c/en/us/td/docs/security/asa/asa83/configuration/guide/config/vpnsysop.pdf>.

* cited by examiner

*Primary Examiner* — Atta Khan
(74) *Attorney, Agent, or Firm* — Hewlett Packard Enterprise Development LP

(57) ABSTRACT

Systems and methods are provided for redistributing virtual private network tunnels among a plurality of virtual private network concentrators. The method includes receiving, from each of the virtual private network concentrators, a respective utilization indicator; selecting a source one of the virtual private network concentrators according to the utilization indicators; selecting a destination one of the virtual private network concentrators according to the utilization indicators; selecting one of the virtual private network tunnels connected to the source one of the virtual private network concentrators; and transferring the selected one of the virtual private network tunnels from the source one of the virtual private network concentrators to the destination one of the virtual private network concentrators.

17 Claims, 10 Drawing Sheets

REDISTRIBUTION OF VPN TUNNELS AMONG VPN CONCENTRATORS

DESCRIPTION OF RELATED ART

The present disclosure generally to electronic data networks, and more particularly to virtual private networks.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Virtual private networks (VPN) allow users to establish secure, private communications channels over unsecured public networks such as the Internet. These secure, private communications channels are commonly referred to as VPN tunnels. Networking devices referred to as "VPN concentrators" are employed to establish and configure these tunnels, to authenticate users, to assign tunnels to users, to ensure delivery of the data flowing through the tunnels, and to encrypt and decrypt the data. For ease of deployment and management, VPN concentrators are often grouped in clusters. The use of the VPN concentrator clusters allows efficient network management, for example by enabling load-balancing among the VPN concentrators in the cluster. One problem that arises in this environment is how to distribute VPN tunnels among the VPN concentrators in a cluster.

The disclosed embodiments provide systems and methods for redistributing VPN tunnels among the VPN concentrators in a cluster. In the disclosed embodiments, each VPN concentrator is capable of establishing a plurality of VPN tunnels with VPN tunnel endpoints. The disclosed technology redistributes existing VPN tunnels among the VPN concentrators according to utilization of the VPN concentrators in the cluster. In the event that all of the VPN concentrators in the cluster become heavily utilized, new VPN concentrators may be added to the cluster. The systems and methods disclosed herein may be implemented within one of the VPN concentrators in the cluster.

Figure 1:
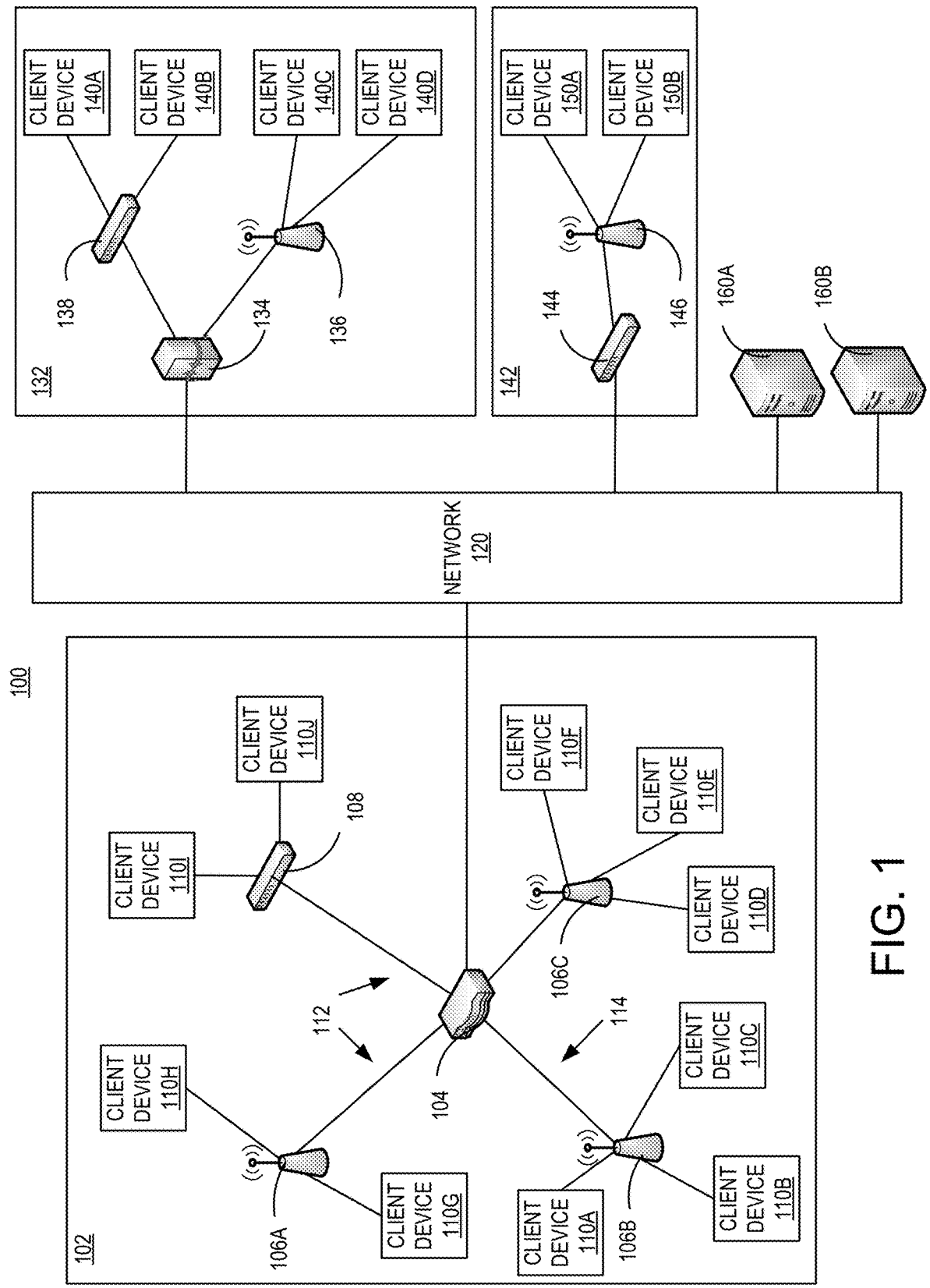
FIG. 1 illustrates one example of a network configuration that may be implemented for an organization, such as a business, educational institution, governmental entity, healthcare facility or other organization.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (Aps) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110$i$-$j$. Client devices 110$i$-$j$ may connect to the switch 108 and through the switch 108, may be able to access other devices within the network configuration 100. The client devices 110$i$-$j$ may also be able to access the network 120, through the switch 108. The client devices 110$i$-$j$ may communicate with the switch 108 over a wired 112 connection. In the illustrated example, the switch 108 communicates with the controller 104 over a wired 112 connection, though this connection may also be wireless.

Wireless APs 106$a$-$c$ are included as another example of a point of access to the network established in primary site 102 for client devices 110$a$-$h$. Each of APs 106$a$-$c$ may be a combination of hardware, software, and/or firmware that is configured to provide wireless network connectivity to wireless client devices 110$a$-$h$. In the illustrated example, APs 106$a$-$c$ can be managed and configured by the controller 104. APs 106$a$-$c$ communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140$a$-$d$.

In various embodiments, the remote site 132 may be in direct communication with primary site 102, such that client devices 140$a$-$d$ at the remote site 132 access the network resources at the primary site 102 as if these clients devices 140$a$-$d$ were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150$a$-$b$ access the network 120. Such a remote site 142 may represent, for example, an individual employee's home or a temporary remote office. The remote site 142 may also be in communication with the primary site 102, such that the client devices 150$a$-$b$ at remote site 142 access network resources at the primary site 102 as if these client devices 150$a$-$b$ were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160$a$-$b$. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160$a$-$b$. Content servers 160$a$-$b$ may include various providers of multimedia downloadable and/or streaming content, including audio, video, graphical, and/or text content, or any combination thereof. Examples of content servers 160$a$-$b$ include, for example, web servers, streaming radio and video providers, and cable and satellite television providers. The client devices 110$a$ j, 140$a$-$d$, 150$a$-$b$ may request and access the multimedia content provided by the content servers 160$a$-$b$.

Figure 2:
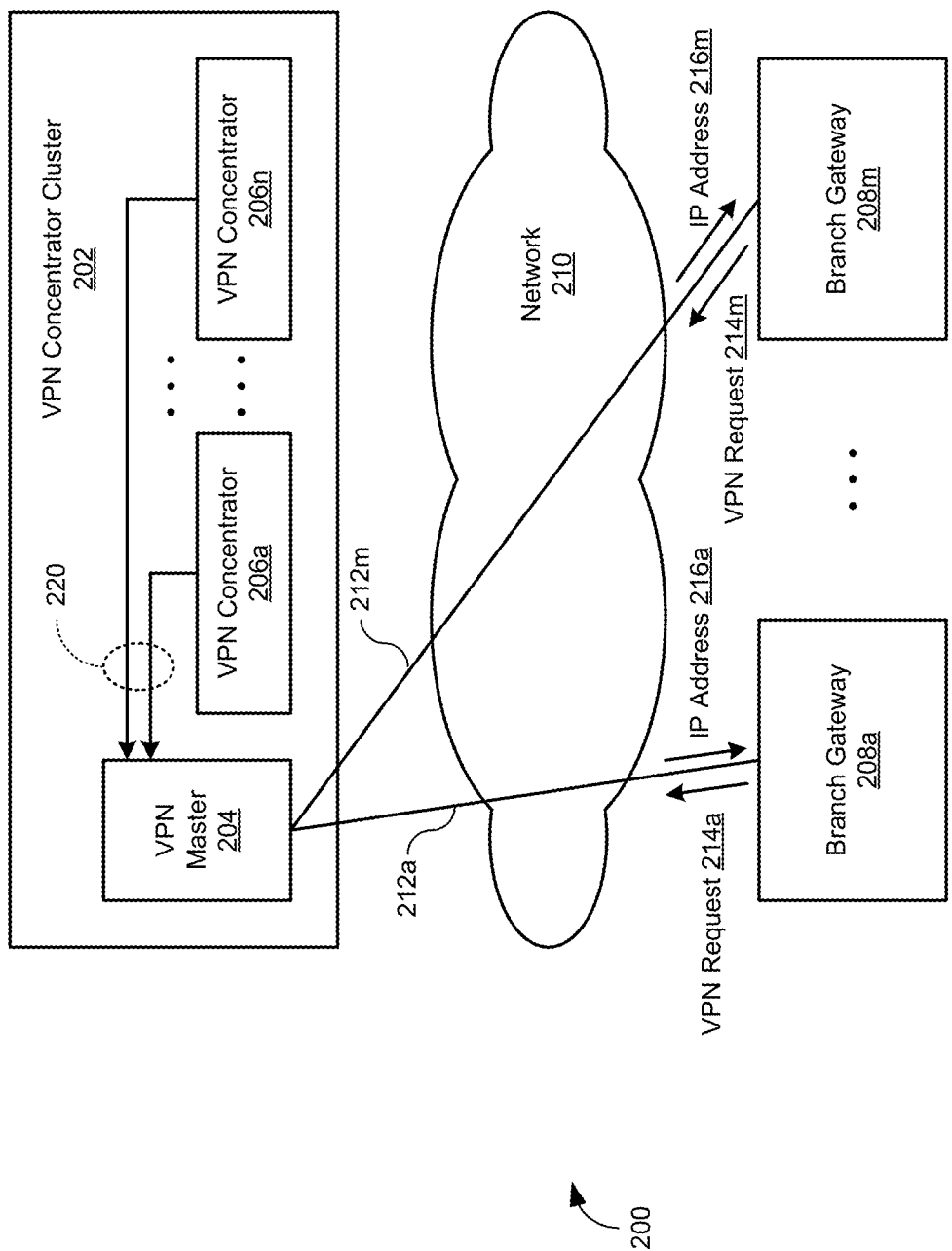
FIG. 2 illustrates an example VPN system according to one embodiment.

Various embodiments of the disclosed technology are now described. FIG. 2 illustrates an example VPN system according to one embodiment. Referring to FIG. 2, the VPN system 200 includes a VPN concentrator cluster 202. The VPN concentrator cluster 202 includes a VPN master 204, and a plurality of VPN concentrators 206$a$ through 206$n$. The VPN master 204 may be implemented within a VPN concentrator 206, as a standalone device, or as a combination thereof. The VPN concentrators 206 transmit operational information 220 to the VPN master 204. The operational information 220 includes information such as the utilization of each VPN concentrator 206, traffic levels on each VPN tunnel connected to one of the VPN concentrators 206, rekey times of the VPN concentrators 206, and the like.

In FIG. 2, it is desirable to establish VPN tunnels with a plurality of branch gateways 208$a$ through 208$m$ over a network 210 such as the Internet. While the embodiment of FIG. 2 is described as establishing VPN tunnels with branch gateways, it should be understood that the disclosed technology may be employed to establish VPN tunnels with any network endpoint capable of supporting that function. In the example of FIG. 2, each branch gateway 208 initiates a VPN tunnel by transmitting a VPN request 214 to the VPN master 204 in the VPN concentrator cluster 202 over a respective network connection 212. In some embodiments, the VPN request 214 is a request to initiate an Protocol Security (IPsec) connection. In some embodiments, the VPN request 214 is a request to initiate a Secure Sockets Layer (SSL) connection. However, other forms of VPN tunnel may be employed.

In response to each VPN request 214, the VPN master 204 selects one of the VPN concentrators 206 and transmits a network address 216 of the selected VPN concentrator 206 to the branch gateway 208 associated with the VPN request 214. Each network address 216 may be, for example, an Internet protocol (IP) address. The VPN master 204 may select the VPN concentrators 206 according to the operational information 220 provided by the VPN concentrators 206, according to an ordering scheme such as a round-robin ordering scheme, according to other methods, or any combination thereof.

Figure 3:
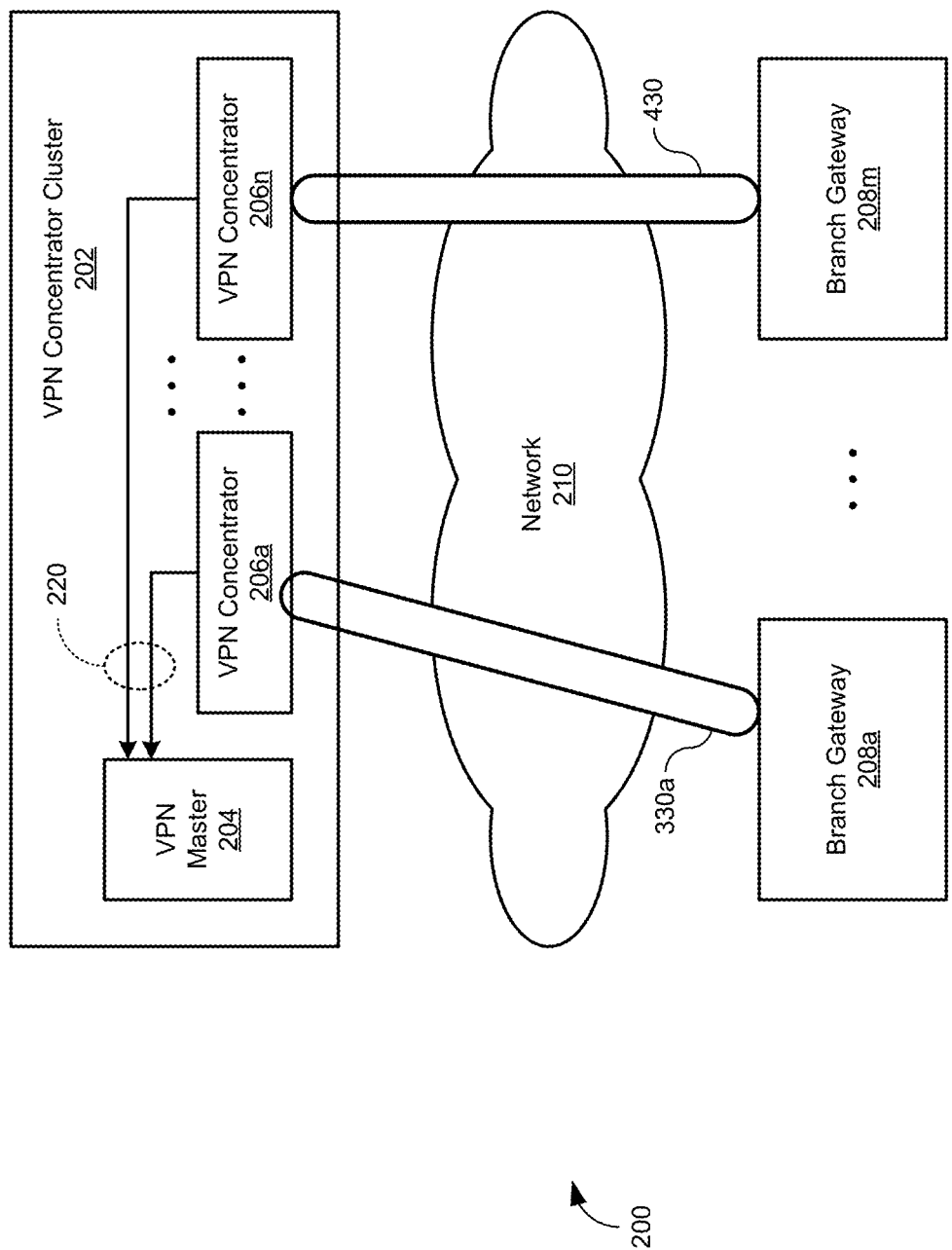
FIG. 3 continues the example of FIG. 2.

FIG. 3 continues the example of FIG. 2. Referring to FIG. 3, upon receiving the network address 216 of a VPN concentrator 206, each branch gateway 208 establishes a connection to a VPN concentrator 206 using the received network address 216, thereby establishing a VPN tunnel 330. In the example of FIG. 3, a VPN tunnel 330a is established between the branch gateway 208a and the VPN concentrator 206a. Similarly, a VPN tunnel 330m is established between the branch gateway 208m and the VPN concentrator 206n.

Figure 4:
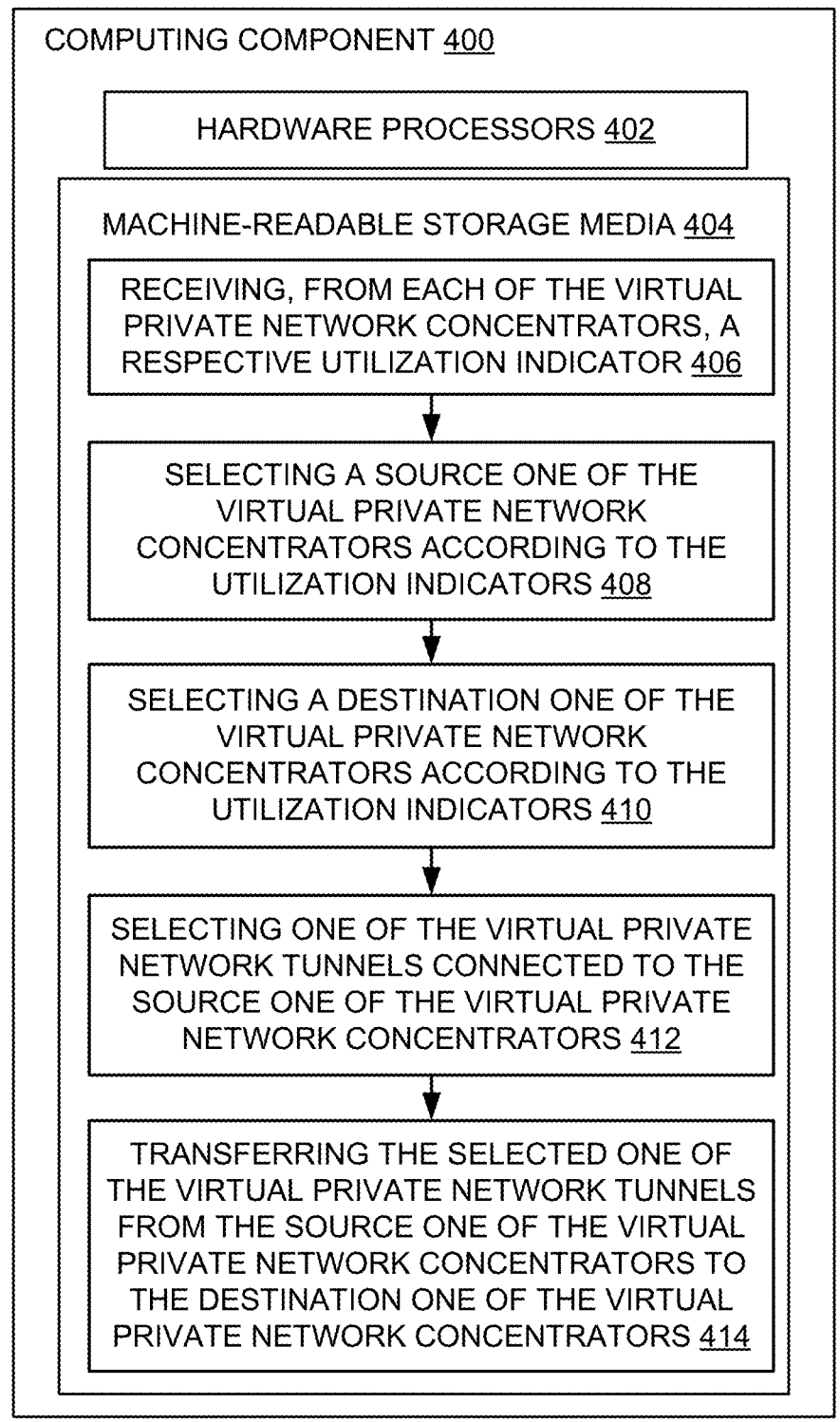
FIG. 4 is a block diagram of an example computing component or device for redistributing VPN tunnels among VPN concentrators in a cluster of the VPN concentrators in accordance with one embodiment.

FIG. 4 is a block diagram of an example computing component or device 400 for redistributing VPN tunnels among VPN concentrators in a cluster of the VPN concentrators in accordance with one embodiment. Computing component 400 may be, for example, a server computer, a controller, or any other similar computing component capable of processing data. In the example implementation of FIG. 4, the computing component 400 includes a hardware processor, 402, and machine-readable storage medium, 404. In some embodiments, computing component 400 may be an embodiment of the VPN master 204.

Hardware processor 402 may be one or more central processing units (CPUs), semiconductor-based microprocessors, and/or other hardware devices suitable for retrieval and execution of instructions stored in machine-readable storage medium, 404. Hardware processor 402 may fetch, decode, and execute instructions, such as instructions 406-414, to control processes or operations for distributing VPN tunnels. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-414.

Hardware processor 402 may execute instruction 406 to perform receiving, from each of the virtual private network concentrators 206, a respective utilization indicator. The utilization indicators may be received as part of the operational information 220 provided by the VPN concentrators 206. The operational information 220 may be provided periodically, on request from the VPN master 204, by other methods, or any combination thereof.

Hardware processor 402 may execute instruction 408 to perform selecting a source one of the VPN concentrators 206 according to the utilization indicators. For example, a VPN concentrator 206 having a relatively high utilization may be selected as the source VPN concentrator. In the example of FIG. 4, the VPN master 204 may select the VPN concentrator 206a as the source VPN concentrator.

Hardware processor 402 may execute instruction 410 to perform selecting a destination one of the VPN concentrators 206 according to the utilization indicators. For example, a VPN concentrator 206 having a relatively low utilization may be selected as the destination VPN concentrator. In the example of FIG. 4, the VPN master 204 may select the VPN concentrator 206n as the destination VPN concentrator.

Referring again to FIG. 4, hardware processor 402 may execute instruction 412 to perform selecting one of the VPN tunnels connected to the source one of the VPN concentrators. In the example of FIG. 4, the VPN master may select the VPN tunnel 330a connected to the source VPN concentrator 206a.

Figure 5:
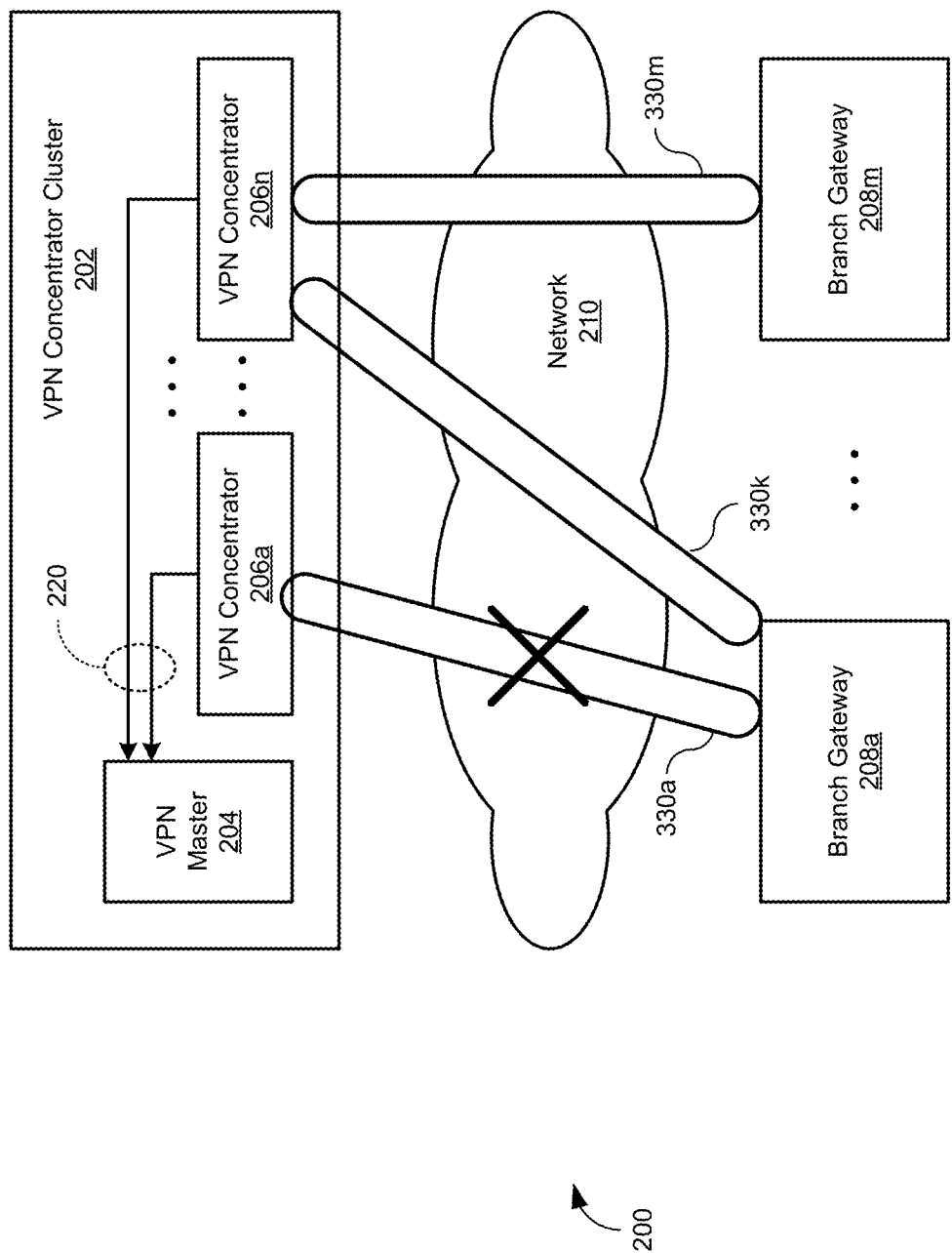
FIG. 5 continues the example of FIG. 4.

Hardware processor 402 may execute instruction 414 to perform transferring the selected one of the VPN tunnels from the source one of the VPN concentrators to the destination one of the VPN concentrators. FIG. 5 continues the example of FIG. 4. Referring to FIG. 5, the VPN master 204 may tear down the selected VPN tunnel 330a, as indicated by the "X" superimposed over the VPN tunnel 330a in FIG. 5. The VPN master 204 may then send a network address 216 of the destination VPN concentrator 206n to the branch gateway 208a. The network address may be an IP address. Upon receiving the network address 216 of the destination VPN concentrator 206n, the branch gateway 208 may establish a connection to the destination VPN concentrator 206n using the received network address 216, thereby establishing a new VPN tunnel 330k, and completing the transfer of the VPN tunnel from the source VPN concentrator 206a to the destination VPN concentrator 206n.

In some embodiments, the VPN master 204 may implement VPN tunnel redistribution in accordance with a rekey time of the source VPN concentrator 206a. According to the current IPSec protocol, each IPSec VPN tunnel 330 rekeys every two hours. That is, the current VPN tunnel 330 is torn down and replaced by a new VPN tunnel 330. The rekey time may be received by the VPN master 204 as part of the operational information 220. The VPN master 204 may redistribute a VPN tunnel 330 connected to the source VPN concentrator 206a in accordance with the rekey time of the source VPN concentrator 206a when there is no traffic traversing that VPN tunnel 330.

In some embodiments, the VPN master 204 may implement VPN tunnel redistribution in accordance with a level of traffic traversing the tunnels 330 connected to the source VPN concentrator 206a. For example, the VPN master 204 may redistribute a VPN tunnel 330 connected to the source VPN concentrator 206a when there is no traffic traversing that VPN tunnel 330.

Figure 6:
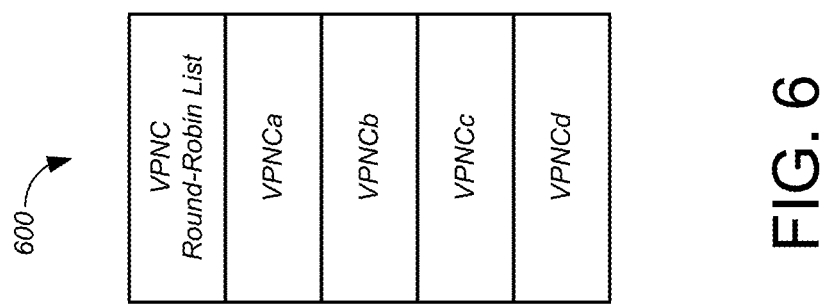
FIG. 6 illustrates a VPN concentrator (VPNC) round-robin list according to one embodiment.

As mentioned above, the VPN concentrators 206 may be selected according to an ordering scheme. For example, referring again to FIG. 2, the VPN master 204 may select the VPN concentrator 206a in response to receiving the VPN request 214a from the branch gateway 208a. In the described embodiments, the VPN concentrators 206 may be selected according to a round-robin scheme, for example by reference to a round-robin list. FIG. 6 illustrates a VPN concentrator (VPNC) round-robin list 600 according to one embodiment. When the VPN master 204 receives a first VPN request 214, the VPN master 204 selects the first VPN concentrator 206 in the VPNC round-robin list 600, denoted VPNCa. When the VPN master 204 receives a second VPN request 214, the VPN master 204 selects the second VPN concentrator 206 in the VPNC round-robin list 600, denoted VPNCb. After selecting the last VPN concentrator 206 in the round-robin list 600, denoted VPNCd, the VPN master 204 returns to the first entry in the list 600, denoted VPNCa. The VPN master 204 directs the branch gateway 208 to connect with the selected VPN concentrator 206, for example as described below.

Figure 7:
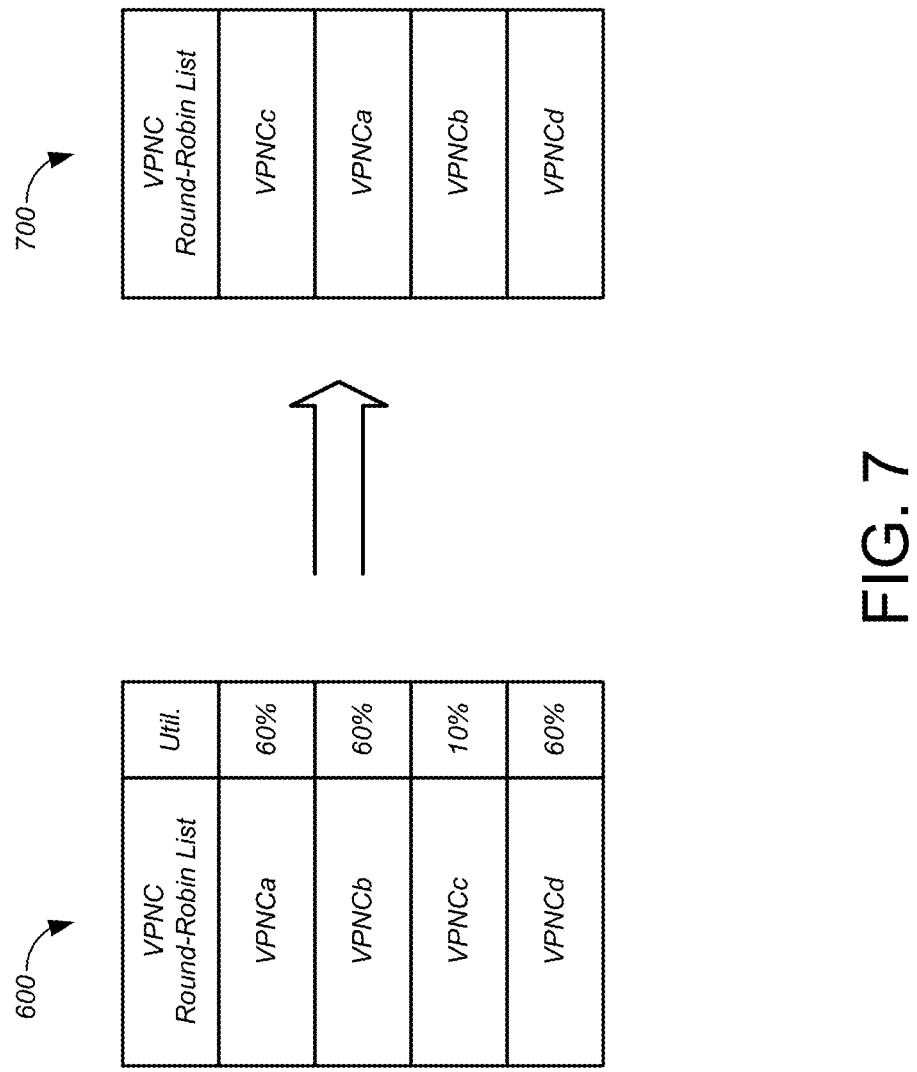
FIG. 7 illustrates reordering the VPN concentrators in the round-robin ordering scheme according to one embodiment.

In some embodiments, selecting a destination VPN concentrator 206 may be implemented according to a round-robin list that is maintained and modified according to the utilization indicators. FIG. 7 illustrates reordering the VPN concentrators 206 in the round-robin ordering scheme according to one embodiment. Referring to FIG. 7, the VPNC round-robin list 600 of FIG. 6 is shown on the left-hand side of FIG. 7, together with a respective utilization percentage for each of the VPN concentrators 206 in the list 600. Each of the VPN concentrators 206 is shown to have a utilization of 60%, except for the VPN concentrator 206 denoted VPNCc, which is shown to have a utilization of 10%. After reordering, the VPNC round-robin list 700 is shown on the right hand side of FIG. 7. As can be seen, the VPN concentrator with the lowest utilization, denoted VPNCc, has been moved to the top of the reordered VPNC round-robin list 700. The VPN master 204 may redistribute VPN tunnels 330 the VPN concentrator 206 VPNC until the utilization of the VPN concentrator 206 VPNC rises to that of the other VPN concentrators 206 (in this case, to 60%). In some embodiments, the VPN concentrator 206 with the lowest utilization is moved to the position in the VPNC round-robin list 700 that is next to be selected by the VPN master 204.

Figure 8:
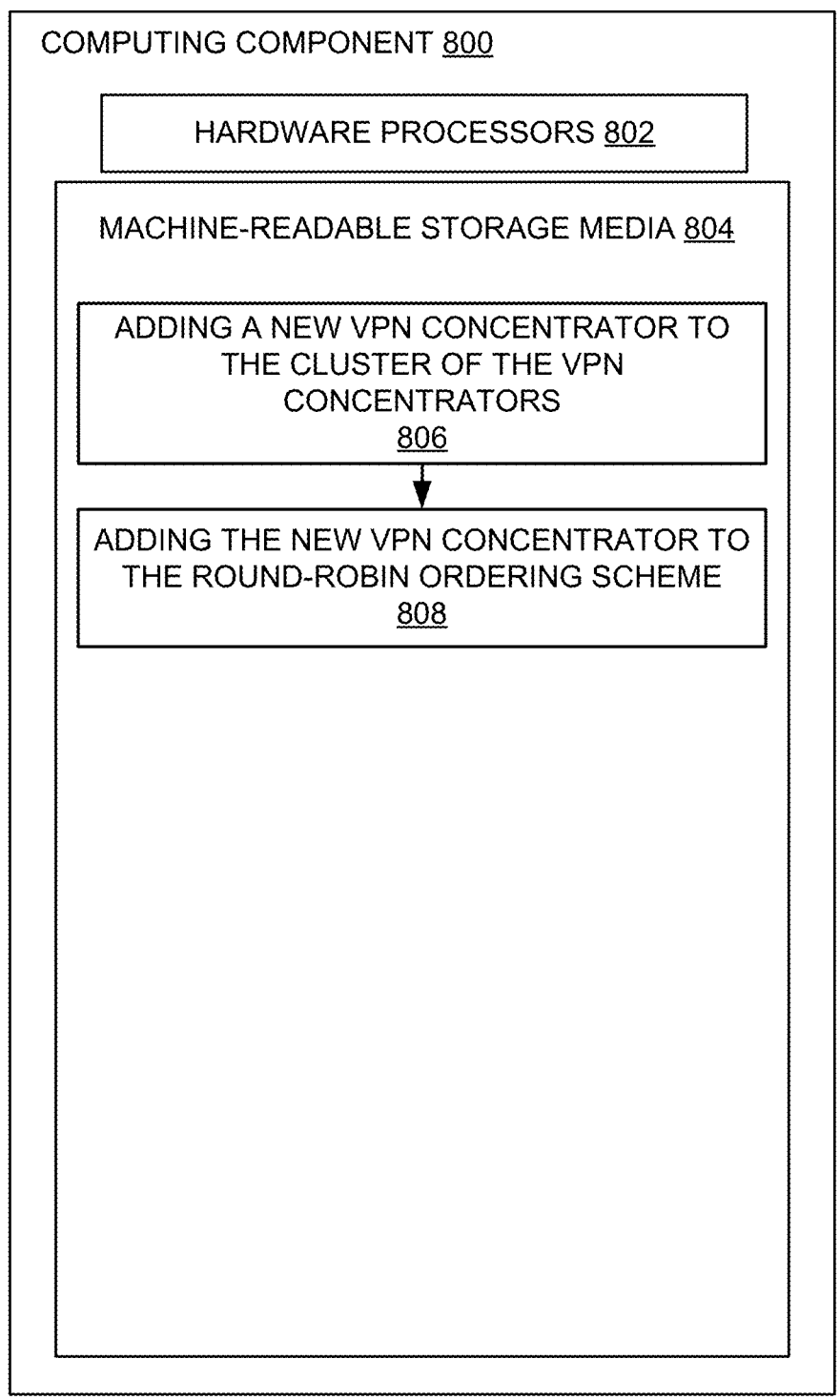
FIG. 8 is a block diagram of an example computing component or device for adding a new VPN concentrator to the cluster in accordance with one embodiment.

FIG. 8 is a block diagram of an example computing component or device 800 for adding a new VPN concentrator 206 to the cluster 202 in accordance with one embodiment. Computing component 800 may be as described above for the computing component 400 of FIG. 4, and may include a similar hardware processor 802 and machine-readable storage medium 804.

Hardware processor 802 may execute instruction 806 to perform adding a new VPN concentrator 206 to the cluster 202 of the VPN concentrators 206. The VPN master 204 may add a new VPN concentrator 206 to the cluster 202 responsive to the utilization of the VPN concentrators 206 currently in the cluster 202 exceeding a collective utilization threshold or the like.

Figure 9:
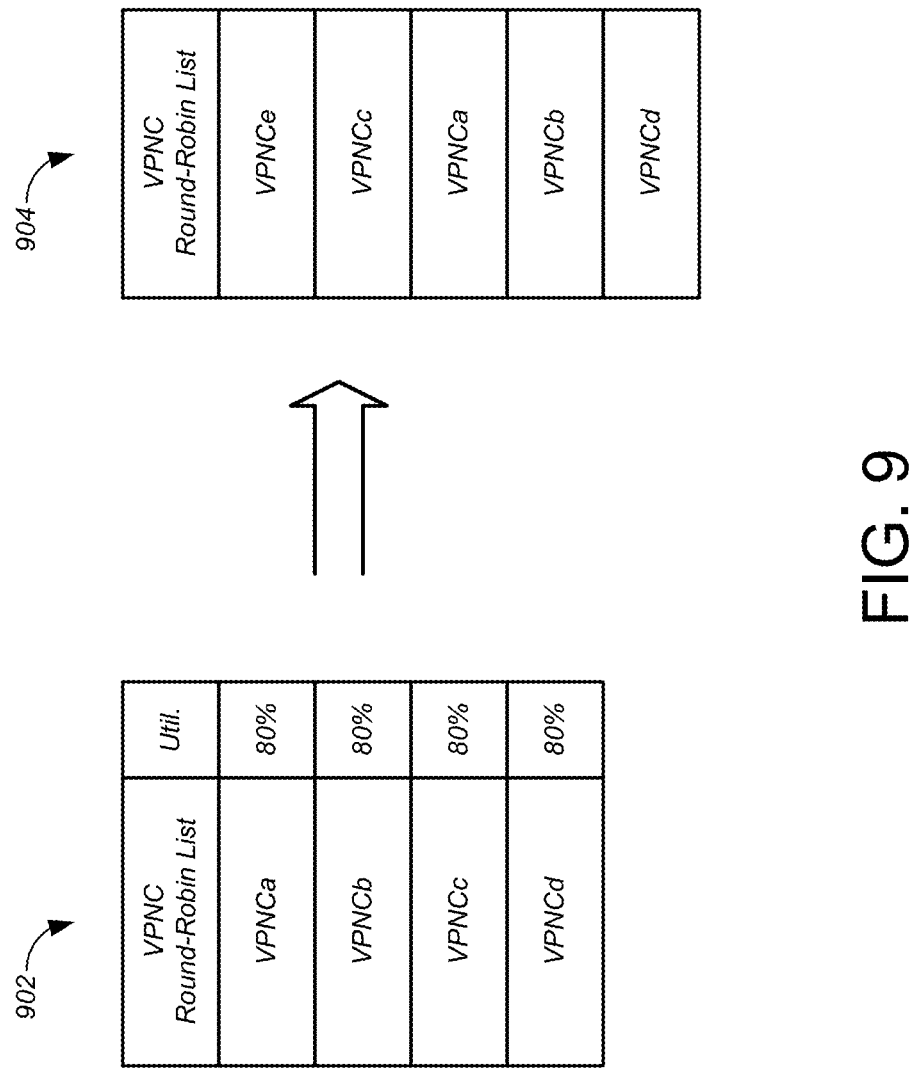
FIG. 9 illustrates the addition of a new VPN concentrator to the round-robin ordering scheme according to one embodiment.

Hardware processor 802 may execute instruction 808 to perform adding the new VPN concentrator 206 to the round-robin ordering scheme. FIG. 9 illustrates the addition of a new VPN concentrator 206 to the round-robin ordering scheme according to one embodiment. Referring to FIG. 9, a VPNC round-robin list 902 before the addition of the new VPN concentrator 206 shown on the left-hand side of FIG. 9. This list 902 includes four VPN concentrators, all with utilization of 80%. A VPNC round-robin list 904 after the addition of the new VPN concentrator 206, denoted VPNCe, is shown on the right-hand side of FIG. 9. Because the newly added VPN concentrator 206 has no utilization when added, it is added to the top of the VPNC round-robin list 904, as shown in FIG. 9.

Figure 10:
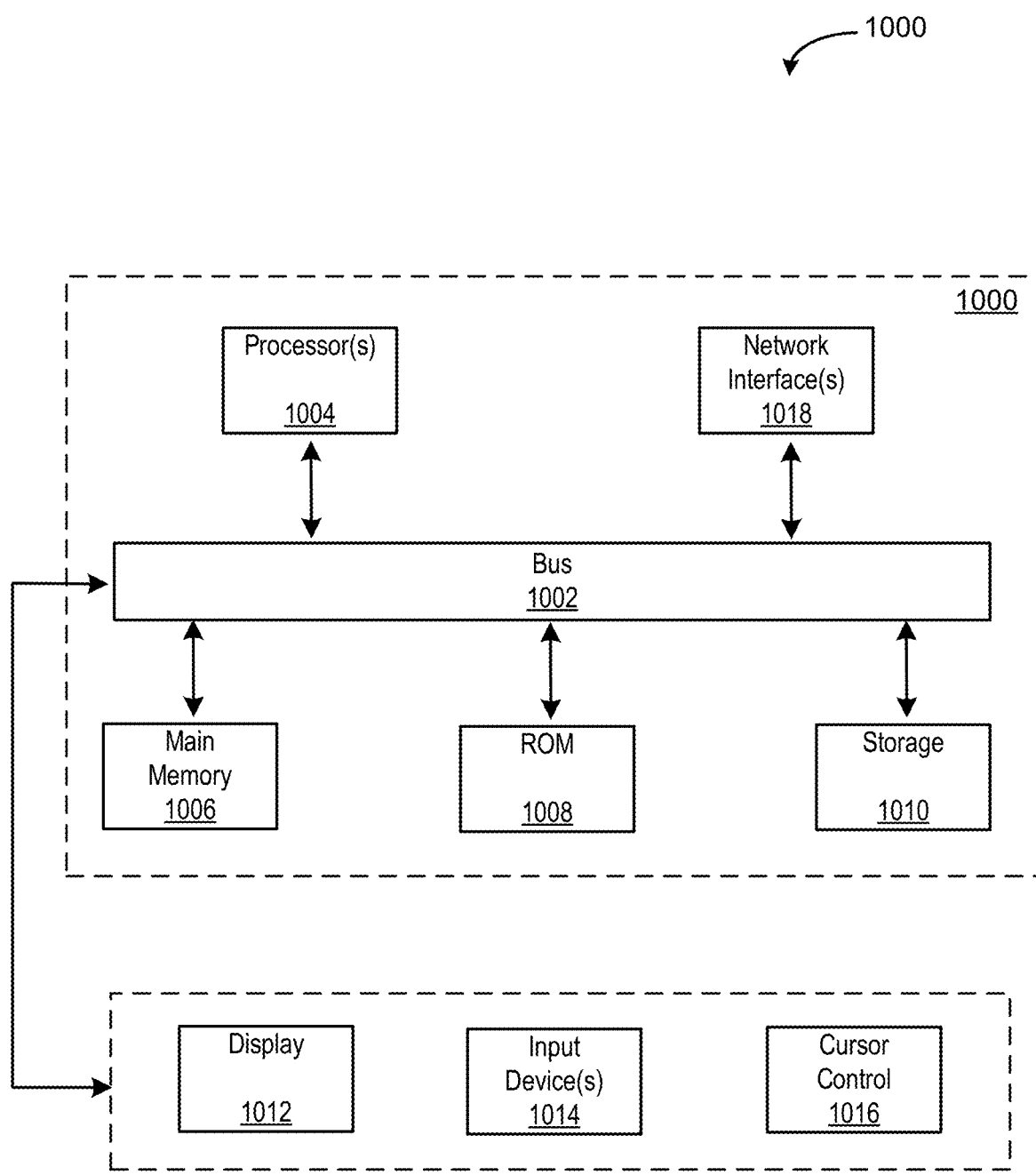
FIG. 10 depicts a block diagram of an example computer system in which various of the embodiments described herein may be implemented.

FIG. 10 depicts a block diagram of an example computer system 1000 in which various of the embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a liquid crystal display (LCD) (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. In some embodiments, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

The computer system 1000 also includes a communication interface 1018 coupled to bus 1002. Network interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, network interface 1018 may be a local area network (LAN) card to provide a data communication connection to a compatible LAN (or WAN component to communicated with a WAN). Wireless links may also be implemented. In any such implementation, network interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network (s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1000.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
a hardware processor; and
a non-transitory machine-readable storage medium encoded with instructions executable by the hardware processor to perform a method for redistributing virtual private network tunnels among virtual private network concentrators in a cluster of the virtual private network concentrators, the method comprising:
receiving, from each of the virtual private network concentrators, a respective utilization indicator;
selecting a source one of the virtual private network concentrators according to the utilization indicators;
selecting a destination one of the virtual private network concentrators according to the utilization indicators;
receiving, from the source one of the virtual private network concentrators, a rekey time of the source one of the virtual private network concentrators;
selecting one of the virtual private network tunnels connected to the source one of the virtual private network concentrators; and
transferring the selected one of the virtual private network tunnels from the source one of the virtual private network concentrators to the destination one of the virtual private network concentrators according to the re-key time.

2. The system of claim 1, wherein the selected one of the virtual private network tunnels connects the source one of the virtual private network concentrators to a virtual private network endpoint, and wherein transferring the selected one of the virtual private network tunnels from the source one of the virtual private network concentrators to the destination one of the virtual private network concentrators comprises:
tearing down the selected one of the virtual private network tunnels; and
sending, to the virtual private network endpoint, a network address of the destination one of the virtual private network concentrators.

3. The system of claim 1, wherein selecting a source one of the virtual private network concentrators according to the utilization indicators comprises:
selecting the destination one of the virtual private network concentrators according to a round-robin ordering scheme of the virtual private network concentrators; and
reordering the virtual private network concentrators in the round-robin ordering scheme according to the utilization indicators.

4. The system of claim 1, the method further comprising:
receiving, from a virtual private network tunnel endpoint, a request to create a virtual private network tunnel;
selecting one of the virtual private network concentrators according to the utilization indicators; and
sending, to the virtual private network tunnel endpoint, a network address of the selected virtual private network concentrator.

5. The system of claim 1, the method further comprising:
receiving, from a virtual private network tunnel endpoint, a request to create a virtual private network tunnel;
selecting one of the virtual private network concentrators according to a round-robin ordering scheme; and
sending, to the virtual private network tunnel endpoint, a network address of the selected virtual private network concentrator.

6. The system of claim 1, the method further comprising:
adding a new virtual private network concentrator to the plurality of the virtual private network concentrators.

7. A non-transitory machine-readable storage medium encoded with instructions executable by a hardware processor of a computing component, the machine-readable storage medium comprising instructions to cause the hardware processor to perform a method for redistributing virtual private network tunnels among virtual private network concentrators in a cluster of the virtual private network concentrators, the method comprising:
receiving, from each of the virtual private network concentrators, a respective utilization indicator;
selecting a source one of the virtual private network concentrators according to the utilization indicators;
selecting a destination one of the virtual private network concentrators according to the utilization indicators;
receiving, from the source one of the virtual private network concentrators, a rekey time of the source one of the virtual private network concentrators;
selecting one of the virtual private network tunnels connected to the source one of the virtual private network concentrators; and
transferring the selected one of the virtual private network tunnels from the source one of the virtual private network concentrators to the destination one of the virtual private network concentrators according to the re-key time.

8. The medium of claim 7, wherein the selected one of the virtual private network tunnels connects the source one of the virtual private network concentrators to a virtual private network endpoint, and wherein transferring the selected one of the virtual private network tunnels from the source one of the virtual private network concentrators to the destination one of the virtual private network concentrators comprises:
tearing down the selected one of the virtual private network tunnels; and
sending, to the virtual private network endpoint, a network address of the destination one of the virtual private network concentrators.

9. The medium of claim 7, wherein selecting a source one of the virtual private network concentrators according to the utilization indicators comprises:
selecting the destination one of the virtual private network concentrators according to a round-robin ordering scheme of the virtual private network concentrators; and
reordering the virtual private network concentrators in the round-robin ordering scheme according to the utilization indicators.

10. The medium of claim 7, the method further comprising:
receiving, from a virtual private network tunnel endpoint, a request to create a virtual private network tunnel;

selecting one of the virtual private network concentrators according to the utilization indicators; and sending, to the virtual private network tunnel endpoint, a network address of the selected virtual private network concentrator.

11. The medium of claim 7, the method further comprising:

receiving, from a virtual private network tunnel endpoint, a request to create a virtual private network tunnel;

selecting one of the virtual private network concentrators according to a round-robin ordering scheme; and sending, to the virtual private network tunnel endpoint, a network address of the selected virtual private network concentrator.

12. The medium of claim 7, the method further comprising:

adding a new virtual private network concentrator to the plurality of the virtual private network concentrators.

13. A method for redistributing virtual private network tunnels among a plurality of virtual private network concentrators, the method comprising:

receiving, from each of the virtual private network concentrators, a respective utilization indicator;

selecting a source one of the virtual private network concentrators according to the utilization indicators;

selecting a destination one of the virtual private network concentrators according to the utilization indicators;

receiving, from the source one of the virtual private network concentrators, a rekey time of the source one of the virtual private network concentrators;

selecting one of the virtual private network tunnels connected to the source one of the virtual private network concentrators; and transferring the selected one of the virtual private network tunnels from the source one of the virtual private network concentrators to the destination one of the virtual private network concentrators according to the re-key time.

14. The method of claim 13, wherein the selected one of the virtual private network tunnels connects the source one of the virtual private network concentrators to a virtual private network endpoint, and wherein transferring the selected one of the virtual private network tunnels from the source one of the virtual private network concentrators to the destination one of the virtual private network concentrators comprises:

tearing down the selected one of the virtual private network tunnels; and sending, to the virtual private network endpoint, a network address of the destination one of the virtual private network concentrators.

15. The method of claim 13, wherein selecting a source one of the virtual private network concentrators according to the utilization indicators comprises:

selecting the destination one of the virtual private network concentrators according to a round-robin ordering scheme of the virtual private network concentrators; and reordering the virtual private network concentrators in the round-robin ordering scheme according to the utilization indicators.

16. The method of claim 13, the method further comprising:

receiving, from a virtual private network tunnel endpoint, a request to create a virtual private network tunnel;

selecting one of the virtual private network concentrators according to the utilization indicators; and sending, to the virtual private network tunnel endpoint, a network address of the selected virtual private network concentrator.

17. The method of claim 13, the method further comprising:

receiving, from a virtual private network tunnel endpoint, a request to create a virtual private network tunnel;

selecting one of the virtual private network concentrators according to a round-robin ordering scheme; and sending, to the virtual private network tunnel endpoint, a network address of the selected virtual private network concentrator.

\* \* \* \* \*